U. L. Leete,

Drafting Garments.

No. 4,225. Reissued Jan. 3, 1871.

Witnesses:
T. A. Lehmann
C. H. Stuler

Inventor:
Ursula Louise Leete

N. PETERS, PHOTO-LITHOGRAPHER, WASHINGTON, D. C.

United States Patent Office.

URSULA LOUISE LEETE, OF NEW HAVEN, CONNECTICUT.

Letters Patent No. 107,068, dated September 6, 1870; reissue No. 4,225, dated January 3, 1871.

DIVISION A.

IMPROVEMENT IN INSTRUMENTS FOR DRAUGHTING GARMENTS.

The Schedule referred to in these Letters Patent and making part of the same.

*To all whom it may concern:*

Be it known that I, URSULA LOUISE LEETE, of New Haven, Connecticut, have invented certain Improvements in "Instruments for Draughting Garments," of which the following is a specification.

*Nature and Objects of the Invention.*

The nature of my invention consists in the construction of an adjustable instrument for draughting ladies' garments, as will hereafter be more fully described and set forth.

*Description of Accompanying Drawing.*

Figure 1:
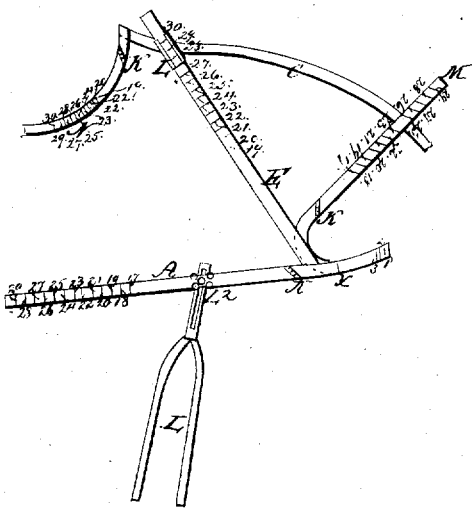

Figure 1 is a view of the instrument for laying out the front of upper garments.

Figure 2:
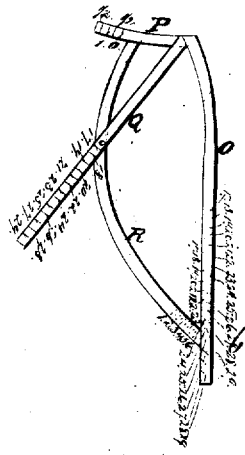

Figure 2, a view of the instrument for draughting a back.

In fig. 1—

A is the main or chest-rule, from which the others depend.

To its upper end is secured the curved arm-size rule M, and at a point near the curve of this arm-size rule is attached a supporting-rule, E, upon which slides the shoulder-bar or rule C.

This shoulder-rule is of peculiar shape, and carries at its lower end the neck-rule N, and is pivoted to a gauge, $L^1$, which moves upon the rule E. By means of this gauge it is adjusted to its proper position distant from the main rule A and relatively to the arm-size rule M.

The dart L is used for taking up the forms on the front of the waist. It is capable of three adjustments on the chest-rule A, viz., sliding back and forth on the rule, moving up and down in the slot, and turning on a pivot, $L^2$.

In fig. 2 a main rule, O, (shoulder-rule,) has affixed at its upper end, at nearly a right angle, a slightly-curved arm-rule P, and from the junction of these two, equidistant therefrom, depends a short bar, Q, to which is pivoted the back-form or rule R. This back-form vibrates to any position on the main rule O.

These several rules are graduated to a scale ascertained by experiment and practice, and governed by the measurements of the body of the person to be fitted.

For convenience of packing the rules are provided with hinges at suitable points, by which means they are folded into a small space.

*Operation—To Draught front of Waist.*

First draw a line two and a half inches from the edge of the cloth to work from. Set the shoulder-gauge to figure 24. Place figure 24 of neck-rule and figure 24 of chest-rule on the line drawn to work from; mark darts; mark arm-size from figure 24 to figure 1. Move shoulder-rule to figure 24 on arm-size, and mark from neck and shoulder. With the straight rule (scale of inches, the back of rule O) measure from *x*, arm-pit, to waistband, 7½, make a dot, which shows length of waist; place the straight end of inch-rule at the line to work from, and draw a line ten and a half inches in length, extending beyond the dot 7½, which shows width of waist. Place the curved corner of inch-rule O at the end of line arm-size; bring side of rule to end of line No. 10½, and mark side seam. This completes the drawing for the front of waist.

*To Draught the Back.*

Hold the shoulder-rule in the right hand, place figure 24, inside row of figures, at upper corner folded edge of cloth, and figure 24 on short bar at folded edge. Draw a line from O, on arm-size, around outside shoulder-rule, to figure 24, upper row of figures; make a dot; mark for shoulder-seam. With the curved rule arm-size draw a line from dot 24, folded edge of cloth, showing width of neck. Get the length and shape of side seam by the same rule as by which the front was drawn, making width of back four inches at bottom of waist. With back-form draw forms for back to suit the taste and style. This completes the drawing for a waist.

Having thus described my invention,

What I claim as new, and desire to secure by Letters Patent, is—

1. The instrument herein described for draughting the front of an upper garment, having its shoulder-rule C and dart-form L connected to the main rules by a slide and pivot, for the purpose set forth.

2. The instrument for draughting the back of an upper garment, having its rule R pivoted to the main rule, as shown and described.

U. L. LEETE.

Witnesses:

C. H. FOWLER,

F. A. LEHMANN.